(12) United States Patent
Birch et al.

(10) Patent No.: US 9,126,281 B2
(45) Date of Patent: Sep. 8, 2015

(54) INTEGRATED FLOW METER

(75) Inventors: David William Birch, Whitehill (GB);
Derrick Ernest Hilton, Frimley (GB);
Martin John Avery, Greenford (GB)

(73) Assignee: Linde Aktiengesellschaft, Munich (DE)

( * ) Notice: Subject to any disclaimer, the term of this patent is extended or adjusted under 35 U.S.C. 154(b) by 702 days.

(21) Appl. No.: 13/382,338

(22) PCT Filed: Jul. 6, 2010

(86) PCT No.: PCT/GB2010/001297
§ 371 (c)(1),
(2), (4) Date: Jan. 31, 2012

(87) PCT Pub. No.: WO2011/004150
PCT Pub. Date: Jan. 13, 2011

(65) Prior Publication Data
US 2012/0175350 A1    Jul. 12, 2012

(30) Foreign Application Priority Data
Jul. 9, 2009 (GB) .................................. 0911930.6

(51) Int. Cl.
*B23K 9/00* (2006.01)
*B23K 9/16* (2006.01)
*B23K 9/32* (2006.01)
*G01F 1/00* (2006.01)
*G01F 15/18* (2006.01)

(52) U.S. Cl.
CPC ... *B23K 9/16* (2013.01); *B23K 9/32* (2013.01);
*G01F 1/00* (2013.01); *G01F 15/185* (2013.01)

(58) Field of Classification Search
CPC .......... B23K 9/16; B23K 9/32; G01F 15/185; G01F 1/00
USPC ............ 73/195, 861, 861.39, 861.77; 219/74, 219/121.33, 121.5, 121.51, 121.55
See application file for complete search history.

(56) References Cited

U.S. PATENT DOCUMENTS

| 6,809,286 | B2 * | 10/2004 | Piechowski et al. ..... 219/121.33 |
| 7,019,248 | B1 | 3/2006 | Uttrachi |
| 7,343,783 | B2 * | 3/2008 | Tilley ................................ 73/40 |
| 2006/0213892 | A1 | 9/2006 | Ott |

* cited by examiner

Primary Examiner — Dana Ross
Assistant Examiner — Joseph Iskra
(74) Attorney, Agent, or Firm — David A. Hey

(57) ABSTRACT

A device for supplying a shielding gas to a welding torch, the device including a cylinder 1 for holding the shielding gas, a valve operatively connected to the cylinder for selectively permitting flow of gas from the cylinder, a regulator for controlling the pressure of the gas flow from the cylinder, and a guard assembly 2 coupled to the cylinder 1 and adapted to protect the valve and regulator from external forces, wherein a flow meter 4 incorporated into the guard assembly 2, the flow meter being adapted to receive the nozzle 5 of a welding torch and measure the flow rate of the gas therein.

7 Claims, 1 Drawing Sheet

INTEGRATED FLOW METER

FIELD OF THE INVENTION

The present invention relates to the field of arc welding, in particular to the provision of the correct flow rate of shielding gas.

BACKGROUND OF THE INVENTION

Arc welding is the most widely used means of joining metals and alloys by fusion techniques in industry today and is of profound importance to industrialised and manufacturing countries. An arc welding process uses the heat generated by an arc struck between an electrode and the workpiece to melt and fuse metal in the joint area. The main arc welding processes in use today include MMA, MIG, TIG, FCAW, MCAW and submerged arc. In most arc welding processes the electrode is consumed to form weld metal, but it may also be a non-consumable electrode, as in TIG and plasma welding. Each process provides a protective gas cover for both the consumable and the molten weld pool to prevent oxidation or contamination. This may be in the form of an external shielding gas.

When using arc welding it is important that welders use the correct shielding gas flow rate. Using a flow rate that it either too high or too low can result in welding defects being introduced into the weld area. Using too much gas can result in turbulence which reduces the mechanical strength of the weld. Using too little gas can result in porosity in the weld area which also reduces the strength of the weld. Oxidation of the weld surface can also result from an incorrect gas flow. Using too much gas also effectively wastes money. Therefore users should be checking their flow rates each day or after breaks. Usually most welders only check the flow rate once.

The most common way of checking flow rate is with a flow meter either attached to the regulator of the gas supply cylinder or integral with the regulator. However this method can create problems because it doesn't take into account any leakage or pressure losses within the hose connecting the cylinder to the welding power source or the welding torch itself. A more accurate technique is to provide the welder with his own personal flow meter, such as a simple bobbin or turbine flow meter, so that he can measure the gas flow rate at the torch. However, very few welders use such a device, often quoting that such units are either easy to break, lose or too expensive to purchase.

There is therefore a need to provide a device which is convenient to use and difficult to lose or break.

The invention aims to provide a small but accurate flow meter built into the cylinder guard that the welder can use whenever he wishes. As the flow meter is close to the cylinder valve and regulator it is convenient to use as he starts work.

SUMMARY OF THE INVENTION

According to the present invention there is provided a device for measuring the flow rate of a shielding gas flow, the device being adapted to fit onto a cylinder supplying the shielding gas, the device comprising a guard assembly for coupling to the cylinder and a flow meter, incorporated into the guard assembly and adapted to receive the nozzle of a welding torch.

Preferably the flow meter is held within holding means integral with the guard assembly.

The invention further provides a device for supplying a shielding gas to a welding torch, the device including a cylinder for holding the shielding gas, a valve operatively connected to the cylinder for selectively permitting flow of gas from the cylinder, a regulator for controlling the pressure of the gas flow from the cylinder, and a guard assembly coupled to the cylinder and adapted to protect the valve and regulator from external forces, wherein a flow meter is provided integral with the guard assembly, the flow meter being adapted to receive the nozzle of a welding torch and measure the flow rate of the gas therein.

The invention as described uses a simple ball or bobbin flow meter integrated directly into the guard of the shielding gas cylinder. However it will be understood that any other suitable flow meter can be used.

Using the present invention allows the wastage of gas to be reduced. It ensures that the correct gas flow rate is being used. Weld defects are also reduced. Further advantages are the convenience and time saving to the welder since he does not have to look for a separate flow meter. The flow meter or flow meter holder may be retro-fitted to common cylinder guards without requiring any additional testing or requalification.

BRIEF DESCRIPTION OF THE DRAWINGS

In order that the invention may be more clearly understood reference will now be made to the accompanying drawings, given by way of example only, in which.

DETAILED DESCRIPTION

Figure 1:
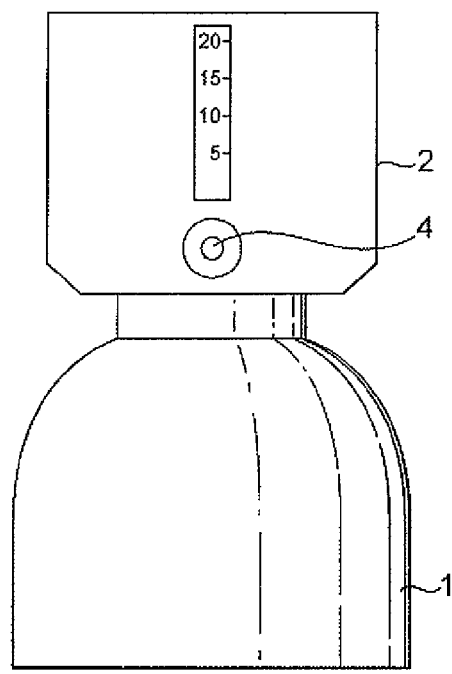
FIG. 1 is a schematic front view of a device according to the invention.
Figure 2:
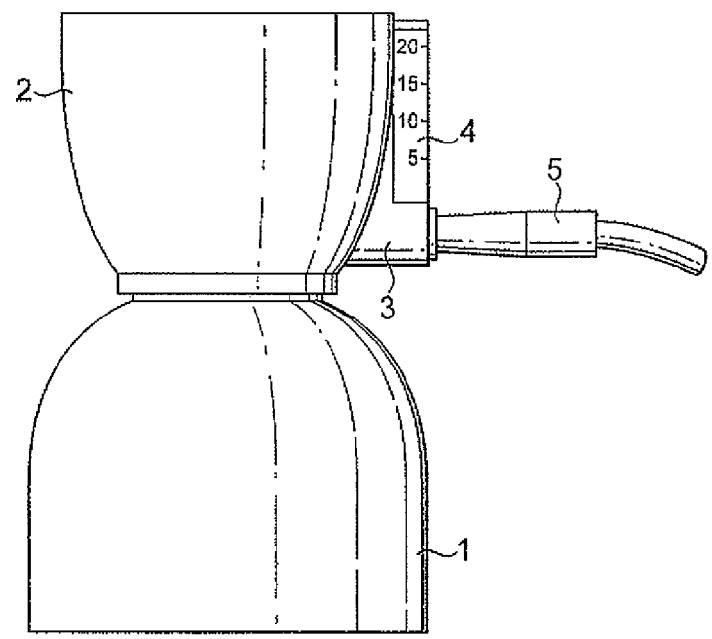
FIG. 2 is a schematic side view of the device according to the invention.

FIGS. 1 and 2 are schematic views of an embodiment of the device in accordance with the invention.

A container or cylinder 1 contains the gas to be used as the shielding gas in arc welding. The gas is pressurised. Although described as a cylinder it will be appreciated by those skilled in the art that the pressurised gas container may be any of several shapes. The cylinder is manufactured from materials having properties suitable to withstand the pressures required.

The cylinder 1 is provided with a valve assembly and a guard assembly 2. A pressure regulating assembly and flow controller are connected to valve by the user. In some cylinders the valve and regulator are a one piece item known as VIPR (Valve with Integrated Pressure Regulator).

The valve assembly (not shown) is provided at an end of the cylinder. Within the valve assembly is a flow path that runs from the inlet (inside of the cylinder) to the outlet (atmospheric side). The valve is operable between a closed position and an open position. When the valve is in the open position gas is supplied from the cylinder. When the valve is in the closed position no gas is released.

A pressure regulating assembly (not shown) is provided downstream (as gas flows from the cylinder) from the valve assembly.

The pressure regulating assembly can be adjusted to control the pressure of gas out of the cylinder to the apparatus that requires the gas supply, in this case a welding torch.

The valve arrangement and pressure regulator assembly are well known in the prior art and will not be described further.

A flow meter (not shown) may be attached to, or integral with, the regulating assembly. This flow meter is referred to below as the "upstream flow meter". Together the valve assembly, pressure regulating assembly and flow meter control the release of gas from the cylinder 1.

Coupled to the cylinder and located over the valve assembly, pressure regulating assembly and flow meter is a guard assembly 2. The guard assembly acts as a protective housing for these members. The guard assembly protects the members so that they can survive the typical handling of the cylinder and any accidental impact. The guard assembly is configured such that there is access to the members controlling the flow.

Attached directly into the guard assembly is a flow meter holder 3. The flow meter holder 3 is designed to hold an integrated flow meter 4 further to any upstream flow meter. This flow meter 4 is adapted to receive the nozzle of a welding torch. The inlet of the flow meter must thus be manufactured of a material capable of withstanding the heat of the shielding gas nozzle. Furthermore it is important that the flow meter holder 3 and flow meter 4 do not increase the footprint of the cylinder 1. Thus the cylinder will not be prevented from fitting into conventional cradles for storage and transportation. The flow meter 4 gives a visual indication of the gas flow rate of the welding torch.

The flow meter holder 3 can be retrofitted onto known existing guard assemblies. A device comprising the adapted guard assembly is capable of fitting onto a range of cylinder sizes.

In an alternative embodiment the flow meter 4 may be directly integrated with the guard assembly. In this case no flow meter holder 3 is required.

The welder using the device according to the invention can easily and accurately check the flow rate of the shielding gas at the welding torch at regular intervals. Since the flow meter 4 is incorporated into the guard assembly of the gas supply cylinder it is at hand. The welder does not have to go looking for a separate flow meter. He merely takes the welding torch and pushes the nozzle 5 of the torch into the inlet of the flow meter incorporated on the guard assembly and presses the gas flow button on the wire feed unit or torch trigger. The flow meter 4 then gives a visual indication of the flow rate at the nozzle of the torch. This is more accurate than that that can be given as the gas leaves the cylinder. If the gas flow rate is not optimum it can be adjusted by the regulating assembly, thus reducing weld defects and the wastage of gas. As the welder is by the cylinder the adjustment can be made immediately.

An additional benefit is that if an upstream flow meter is fitted to the regulator or integrated in it comparing the reading on this upstream flow meter and the flow meter 4 in the guard will indicate to the user if there is a gas leak in the system. This will not only reduce gas wastage but leaks allow the ingress of air into the system which will reduce the quality of the shielding gas and perhaps increase the number of weld defects.

The invention has been described above with respect to a preferred embodiment. It will be understood by those skilled in the art that changes and modifications may be made thereto without departing from the scope of the invention as set out in the appended claims.

The invention claimed is:

1. A device for measuring the flow rate of a shielding gas flow, the device being adapted to fit onto a cylinder supplying the shielding gas, the device comprising a guard assembly for coupling to the cylinder and a flow meter incorporated into the guard assembly and adapted to receive the nozzle of a welding torch.

2. A device as claimed in claim 1 in which the flow meter is held within holding means integral with the guard assembly.

3. A device as claimed in claim 1 wherein the flow meter has a visual display.

4. A device as claimed in claim 3 wherein the flow meter has a ball or bobbin type of display.

5. A device for supplying a shielding gas to a welding torch, the device including a cylinder for holding the shielding gas, a valve operatively connected to the cylinder for selectively permitting flow of gas from the cylinder, a regulator for controlling the pressure of the gas flow from the cylinder, and a guard assembly coupled to the cylinder and adapted to protect the valve and regulator from external forces, wherein a flow meter is incorporated into the guard assembly, the flow meter being adapted to receive the nozzle of a welding torch and measure the flow rate of the gas therein.

6. A device as claimed in claim 5 wherein the flow meter is held within holding means integral with the guard assembly.

7. A method of measuring the flow rate of a shielding gas flow, the method comprising placing the nozzle of a welding torch into an inlet of a flow meter, the flow meter being integral with a guard assembly of the cylinder supplying the shielding gas.

\* \* \* \* \*